United States Patent [19]

Eschbach

[11] Patent Number: 5,258,854
[45] Date of Patent: Nov. 2, 1993

[54] CONVERTING BETWEEN WRITE-WHITE, WRITE-BLACK AND NEUTRAL BITMAPS

[75] Inventor: Reiner Eschbach, Webster, N.Y.

[73] Assignee: Xerox Corporation, Stamford, Conn.

[21] Appl. No.: 802,791

[22] Filed: Dec. 6, 1991

[51] Int. Cl.$^5$ ............................................. H04N 1/40
[52] U.S. Cl. ................................... 358/445; 358/447; 358/451; 358/455; 382/55; 382/47
[58] Field of Search ............... 358/445, 447, 455, 456, 358/451, 448, 454, 443; 382/55, 47

[56] References Cited

U.S. PATENT DOCUMENTS

| | | | |
|---|---|---|---|
| 4,466,123 | 8/1984 | Arai et al. | 382/55 |
| 4,837,847 | 6/1989 | Shirasaka et al. | 382/55 |
| 5,045,952 | 9/1991 | Eschbach | 358/447 |
| 5,060,082 | 10/1991 | Matsumoto et al. | 358/451 |
| 5,117,294 | 5/1992 | Yano | 358/447 |
| 5,134,503 | 7/1992 | Kimura | 358/448 |
| 5,166,810 | 11/1992 | Sorimachi et al. | 358/451 |

OTHER PUBLICATIONS

An Optimum Method for Two-Level Rendition of Continuous-Tone Pictures, B. E. Bayer, IEEE International Conference on Communications, vol. 1, pp. 26-11 to 26-15 (1973).

An Adaptive Algorithm for Spatial Greyscale, Floyd and Steinberg, Proceedings of the SID 17/2, 75-77 (1976).

*Primary Examiner*—Edward L. Coles, Sr.
*Assistant Examiner*—Fan Lee
*Attorney, Agent, or Firm*—Mark Costello

[57] ABSTRACT

A bitmap to be prepared for printing by a printing process with a characteristic dilation or erosion artifact, is initially increased in resolution by a selected factor. The bitmapped image is then increased or decreased in size, at the increased resolution, by an amount necessary to compensate for the characteristic erosion or dilation of the printing process. The bitmap is rescanned, or reduced in resolution, to the original resolution of the image. The rescanned image is highly binary in appearance, but will include a number of gray level pixels in areas where it has been increased in size. Prior to printing, the pixel values are subjected to a quantizing process where gray level pixel values are reduced to binary values, preferably through an error diffusion process which operates only on gray pixels. The process of increasing the bitmap resolution may include a step of smoothing halfbitting.

13 Claims, 8 Drawing Sheets

CONVERTING BETWEEN WRITE-WHITE, WRITE-BLACK AND NEUTRAL BITMAPS

The present invention is directed to a method of scaling bitmapped images by small amounts, and more particularly, to scaling bitmapped images by amounts necessary to compensate for the inherent effects of a printing process.

BACKGROUND OF THE INVENTION

Electronically stored images are commonly printed from bitmap representations, where a bitmap represents the image in terms of m×n array of pixels. Commonly, the pixels in such an array are binary, or representable as 0 or 1, ON or OFF, black or white. A well known binary printing system includes an electrophotographic engine with an exposure device including a laser, which is allowed to expose a photoconductive surface to dissipate a uniformly deposited charge thereon in accordance with the bitmap.

Two types of electrophotographic systems are well known and in common use. In a first system, commonly referred to as a write-white or charged area development system, a laser dissipates charge on the photoconductive surface in areas where development or printing is not desired. Thus, it might be said that white pixels are written to the photoconductive surface. In a second system, commonly referred to as a write-black or discharged area development system, the laser dissipates charge on the photoconductive surface in areas where development or printing is desired. Thus, it may be said that black pixels are written to the photoconductive surface.

While each system has advantages and disadvantages, each is capable of producing a high quality reproduction. However, each has a distinct artifact occurring as a result of the imaging process. Write-white systems tend to shrink or erode black lines, while write-black systems tend to expand black lines. The change in line width can lead to the breaking of letters for small fonts in write-white printers, along with the overall appearance of the printed image appearing to be too light. For write-black printers, the result may be a closing of small letters, along with the overall appearance of a printed image appearing too dark. Knowing these tendencies, some printer manufacturers selling fonts (sets of bitmap images representing alphanumeric character sets) have pre-compensated their fonts to account for one type of printing process or the other. However, in an open systems environment, where write-white and white-black printers are provided for the same users, such pre-compensated fonts are troublesome. Additionally, such pre-compensation does not consider images other than from fonts.

U.S. patent application Ser. No. 07/588,125, entitled "Bitmap Image Resolution Converter Compensating for Write White Xerographic Processes" by L Mailloux, and assigned to the same assignee as the present invention, addresses a particular conversion of a 300 spot per inch (spi) write-black bitmap to a 600 spi write-white bitmap with a process that dilated or expanded the image by a small amount in the context of resolution conversion by bit doubling, with a state selection process that tended to slightly favor a black state over a white state. The described process works, but is not generalized, does not teach conversion from write-white, does not deal with the problem of conversion without an output resolution change, does not teach conversion to either write-black or write-white from a neutral bitmap and does not take into account the need for a variety of compensation amounts. Smoothing and half bit removal are provided at the higher resolution.

U.S. Pat. No. 5,208,871 to Eschbach, and assigned to the same assignee as the present invention, describes a method of converting an image from a first resolution, bit depth and orientation to a second resolution, bit depth and orientation, by emulating the process of printing the bitmap at the first resolution, bit depth and orientation, emulating the process of scanning the bitmap at the second resolution, and orientation, and quantizing from the second resolution to a desired output resolution using error diffusion.

SUMMARY OF THE INVENTION

In accordance with the invention, there is provided a method for eroding or dilating a bitmapped image on a fractional pixel basis to pre-compensate the image for certain printing artifacts.

In accordance with one aspect of the invention, a bitmap to be prepared for printing by a printing process with a characteristic dilation or erosion artifact, is initially increased in resolution by a selected factor. The bitmapped image is then increased or decreased in size, at the increased resolution, by an amount necessary to compensate for the characteristic erosion or dilation of the printing process. The bitmap is rescanned, or reduced in resolution, to the original resolution of the image. The rescanned image is highly binary in appearance, but will include a number of gray level pixels in areas where it has been increased in size. Prior to printing, the pixel values are subjected to a quantizing process where gray level pixel values are reduced to binary values.

In accordance with another aspect of the invention, the process of increasing the bitmap resolution may include a step of smoothing halfbitting, to avoid an undesirable effect artifacts caused by the potential of halfbitting in the input bitmap.

In accordance with still another aspect of the invention, the process of quantization, because the images resulting from the described process are highly binary in nature, may advantageously include an adaptive error diffusion process, in which error is directed to adjacent neighbors based on their status as correct or legal values.

In accordance with yet another aspect of the invention, there is provided a method of pre-compensating a bitmap of a binary image defined with pixels k×l at a first resolution (where k,l is an abbreviation of $k\Delta x_{in}$, $l\Delta y_{in}$) and a pixel depth of 2 levels, where k represent a number of pixels k in a scan line parallel to a fast scan direction, referred to as x-direction and l represents a number of scan lines l of pixels in a slow scan direction, referred to as y-direction, to account for erosion or dilation effects of an imaging process, by increments not equal to a pixel distance, including the steps of: increasing the number of pixels or resolution at which the bitmap is defined from k×l, to Kk×Ll, where K and L are multipliers, thereby increasing the resolution of the bitmap by the same factors while keeping the area constant, i.e.: $k\Delta x_{in}$, $l\Delta y_{in}$ is transformed to $Kk(\Delta x_{in}/K)$, $Ll(\Delta y_{in}/L)$; varying the amount of pixels at a first state with respect to pixel at a second state, defined at resolution Kk×Ll, the variation in the amount of first state pixels occurring at transitions in the image from first state pixels to second state pixels; decreasing the resolution at which the bitmap is defined from Kk×Ll to k×l, and increasing the pixel depth at which the image is defined to c levels, where c is an integer greater than 2; and quantizing pixels in the image defined at n levels to reduce the number of levels at which the pixels are defined to 2.

These and other objects and advantages of the present invention will become apparent from the following description taken together with the drawings in which:

FIG. 1 shows a block diagram of the system of the invention;

FIGS. 2, 3, 4, 5, and 9 graphically illustrate the process of the present invention;

Figure 7:
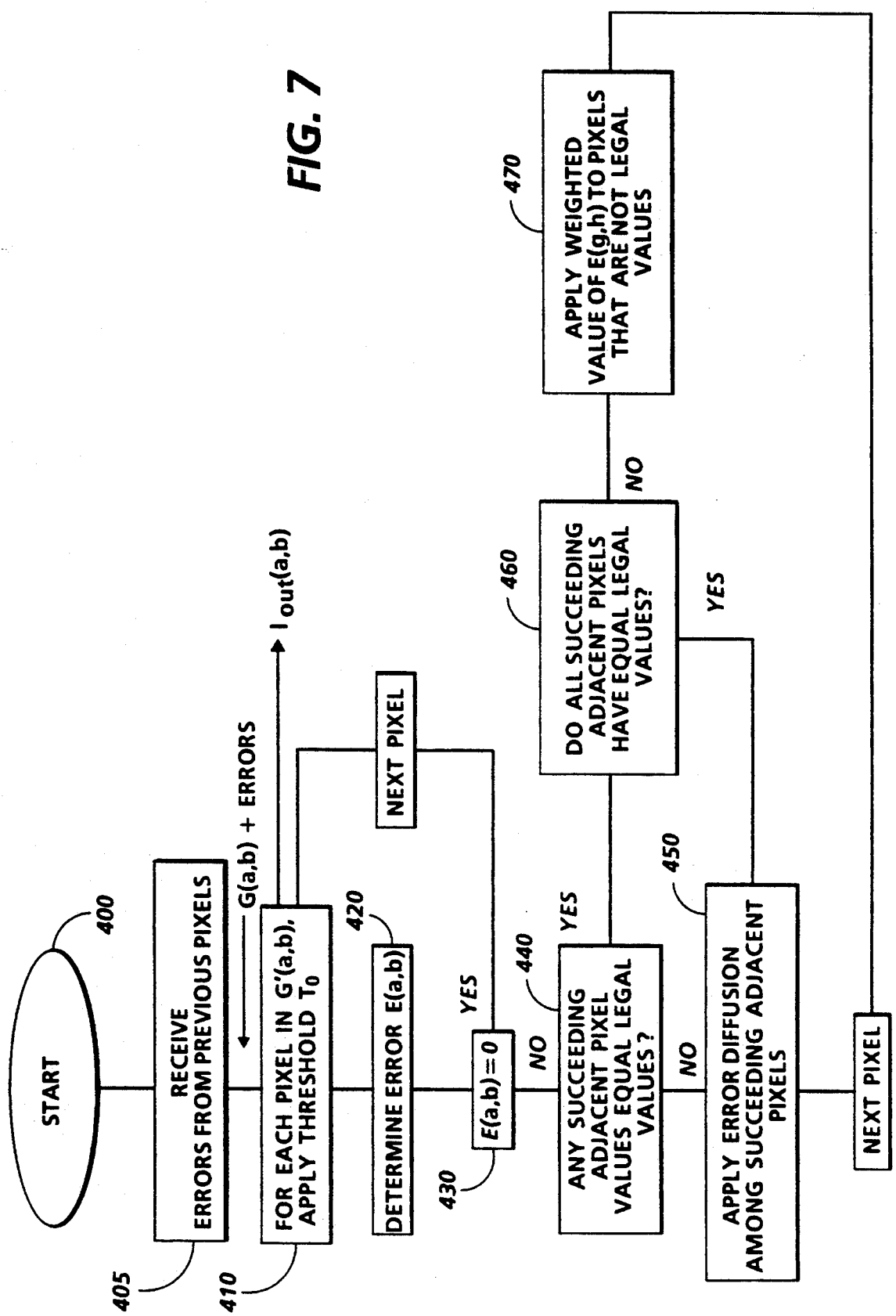
FIG. 7 shows a flow chart of an adaptive error diffusion method that finds advantageous use with respect to the present invention.
Figure 8:
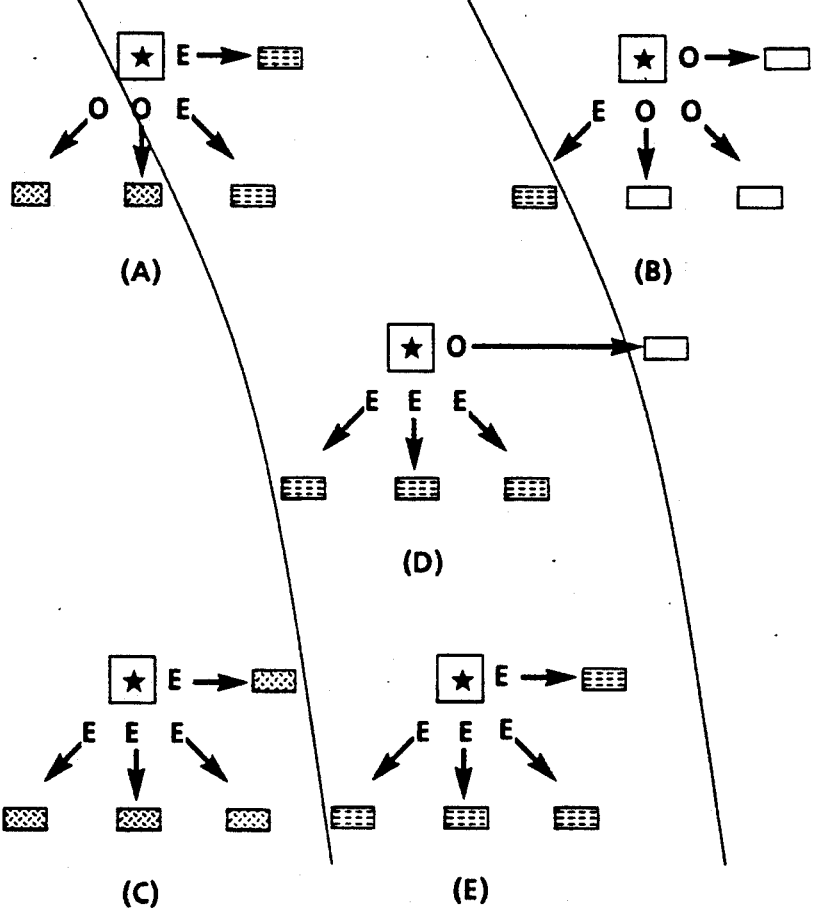
Figure 10:
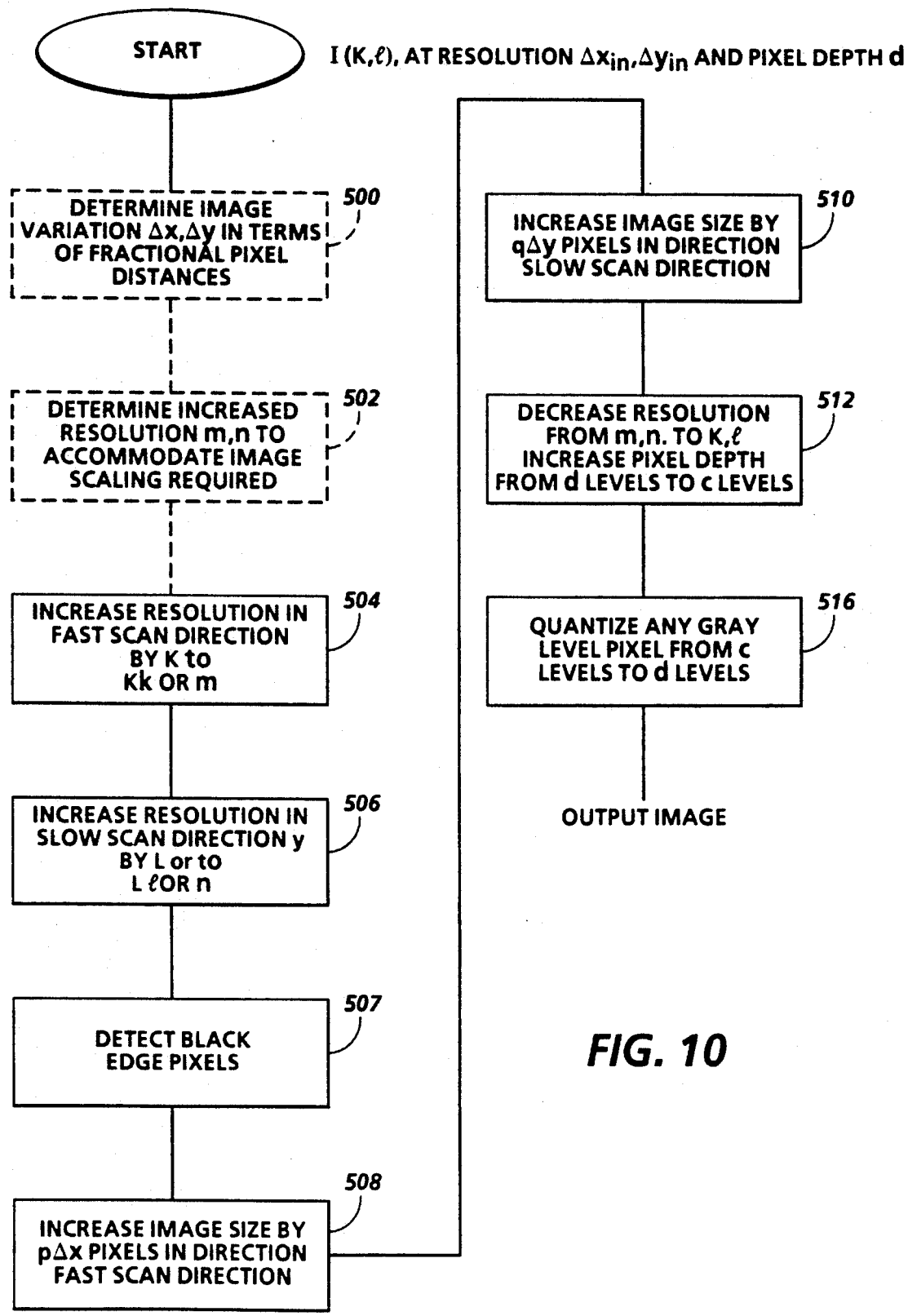

FIG. 8 graphically illustrates the adaptive error diffusion method of FIG. 7; and FIG. 10 shows a flow chart describing the process of the present invention.

Figure 1:
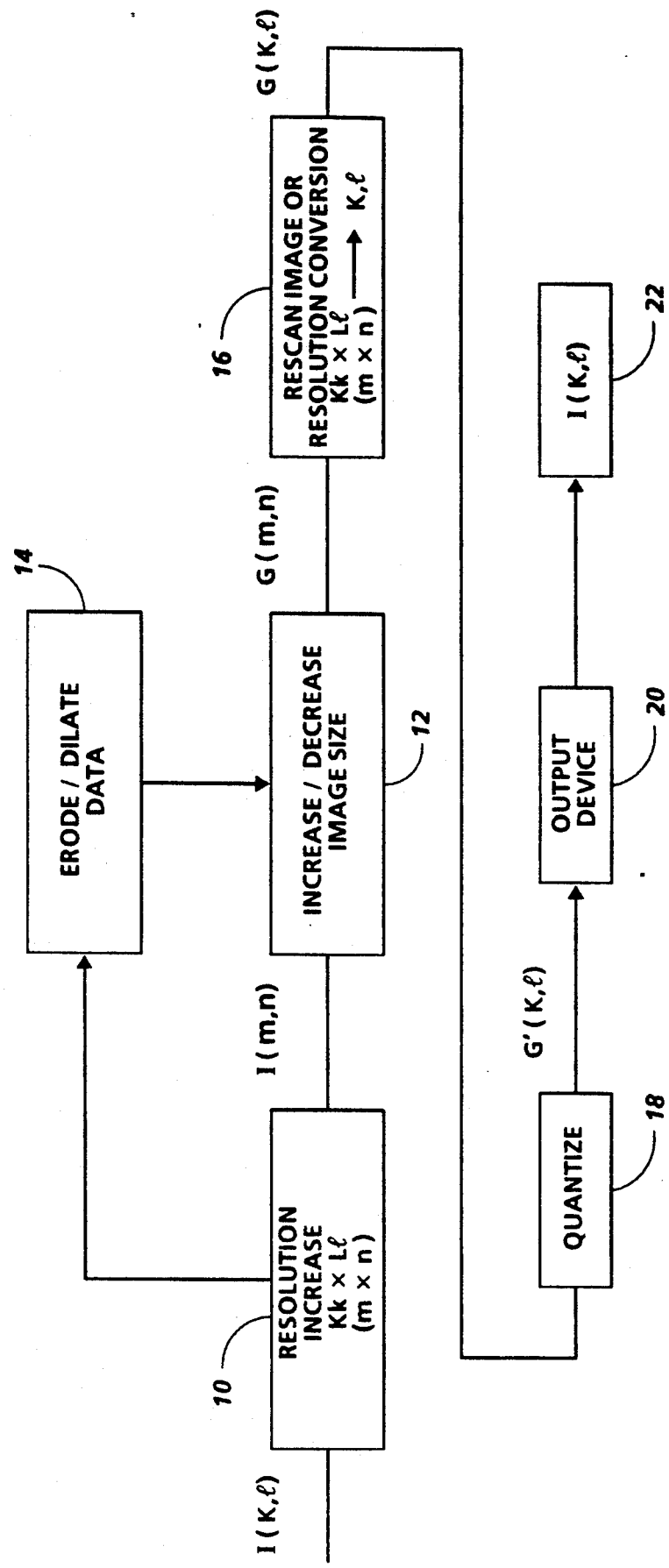

Referring now to the drawings where the showings are for the purpose of illustrating an embodiment of the invention and not for limiting same, FIG. 1 illustrates a block diagram of a system accomplishing the invention. Image I(k,l) at a first resolution and bit depth, preferably, although not necessarily binary, is directed through a resolution conversion process 10, the output of which is the same image at a higher second resolution, I(m,n) (where, m=Kk, n=Ll), where the second, higher resolution can be determined from block 14 as indicated in FIG. 1, or implementation considerations based on the accuracy required. The image I(m,n) is increased or decreased in size in accordance with empirical data stored in a memory 14 at an increase/decrease image size process 12, to produce an image G(m,n), an altered version of I(m,n), still at the higher second resolution. A second resolution or re-scanning process 16 converts G(m,n) from the higher resolution, to G(k,l) at the first resolution. G(k,l) includes, as part of the re-scanning process some gray level pixels, which require quantization, to reduce them from definition at a set of c levels to definition at the desired output set of d levels, which will commonly, although not necessarily, be binary. Image G'(k,l) produced as a result of the quantization step is then directed to the output device 20, which will probably be either a write-white or write-black printer. The output image of output device 20, should be an image that has an appearance similar to I(k,l).

Figures 2, 3:
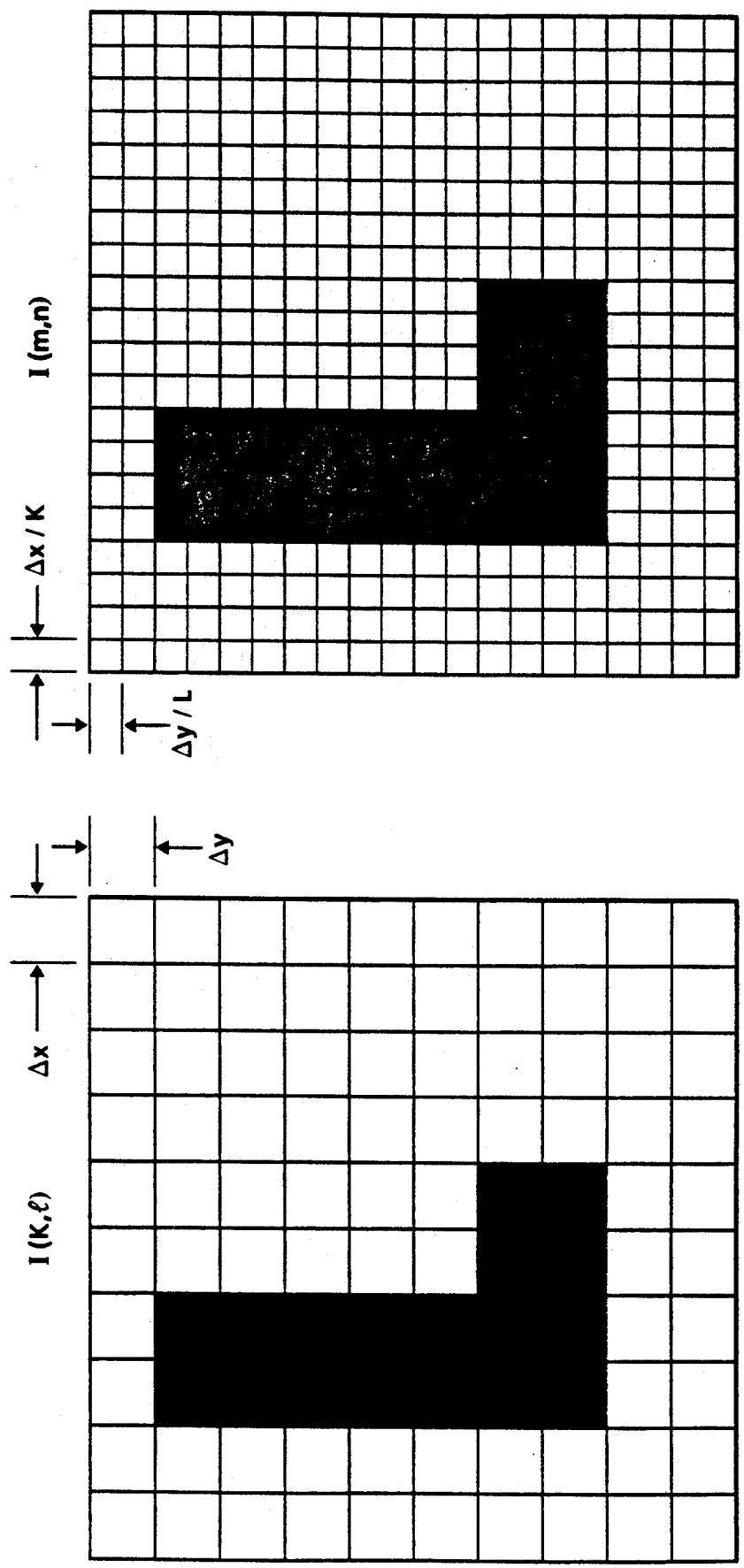

Beginning with FIG. 2, which shows an example image I(k,l) defined for an k×l array of pixels, having binary values defining the optical density of the image at each pixel position therein. In the following example, the image will be compensated to account for an erosion by ½ pixel unit caused by the example printer, by increasing the size of the image by ½ pixel unit. For erosion or dilation by an increment of $p/r$ pixel (where pixel in this context is used to denote a distance measurement equivalent to one pixel) in the fast scan direction, K=r) and for erosion or dilation by an increment of $q/r$ pixel in the slow scan direction, L=r. FIG. 3 shows an initial step in the inventive pre-compensation process, increasing the resolution of the image to Kk×Ll, or, hereinafter, m×n. In this case, K=L=2, although it is not necessary for K to equal L. It will no doubt be appreciated that there are many processes for increasing the resolution of the image, with the basic process including bit doubling, in which the value of each pixel at the original resolution k×l is repeated in each of two directions in which the image is described, hereinafter referred to as the fast scan direction (x or m) and the slow scan direction (y or n). Thus, bit doubling determines the value of a pixel, and stores to an image storage location a group of four pixel positions. Fairly complex algorithms may be used to determine whether the new pixels should be designated as black or white, as shown in the co-pending U.S. pat. appl. Ser. No. 07/802,790, filed Dec. 6, 1991 by R. Eschbach, incorporated herein by reference. It will no doubt be appreciated that the increase in resolution by a factor of 2 was carefully selected to meet the requirement of a pre-compensation process requiring a half pixel size compensation. If the size increase or decrease was by a factor related to ⅓ of a pixel, the resolution conversion might be by a factor of 3, or bit tripled. If the size increase or decrease was by a factor related to ¼ of a pixel, the resolution conversion might be by a factor of 4, or bit quadrupled.

With image I(m,n) now defined as shown in FIG. 3, the same image as originally shown in FIG. 2 is present, defined at four times as many pixel locations in the image. At FIG. 4, the image is now scaled or increased in size by an amount determined in accordance with the printing process dilation or erosion artifact. In the case of one known printer, the amount of erosion of the image caused by a write-white process is by about one half pixel, at the original resolution, or one pixel at the new resolution. Accordingly the bitmap of the image is increased in size by a corresponding amount so that, after printing, the image will be the correct size. At FIG. 4, this pixel addition is shown by adding an additional pixel to the black portion of the image in the fast scan and slow scan directions. This type of size increase is possible because the primary erosion and dilation effects of the write-white and write-black printing occur at edges, or abrupt changes from black to white within scenes in the image.

The method of determining the amount and direction of the increase of the image size may be accomplished in many ways. In the simplest case, as shown, a write-white system operates to obtain the undesirable artifact only on black pixels, and only on edge pixels. Accordingly, each pixel is tested to determine whether it represents a black edge pixel, or a black pixel with a white pixel adjacent to it in either the fast scan direction or the slow scan direction. In the example, a very simple process is used. Despite the fact that write-white erosion would occur at all edges of the image, it may be necessary only to compensate in a single edge direction of the fast scan and slow scan axes. Accordingly, in the present example, the edge test for an edge pixel looks to see it the edge is unprocessed direction, to the right and down FIG. 4. Of course, many other algorithms may be used to address the particular requirements of a system. It will no doubt be recognized that one such system may not process the pixels of the image in strict left-to-right, down-the-page order.

Figure 4:
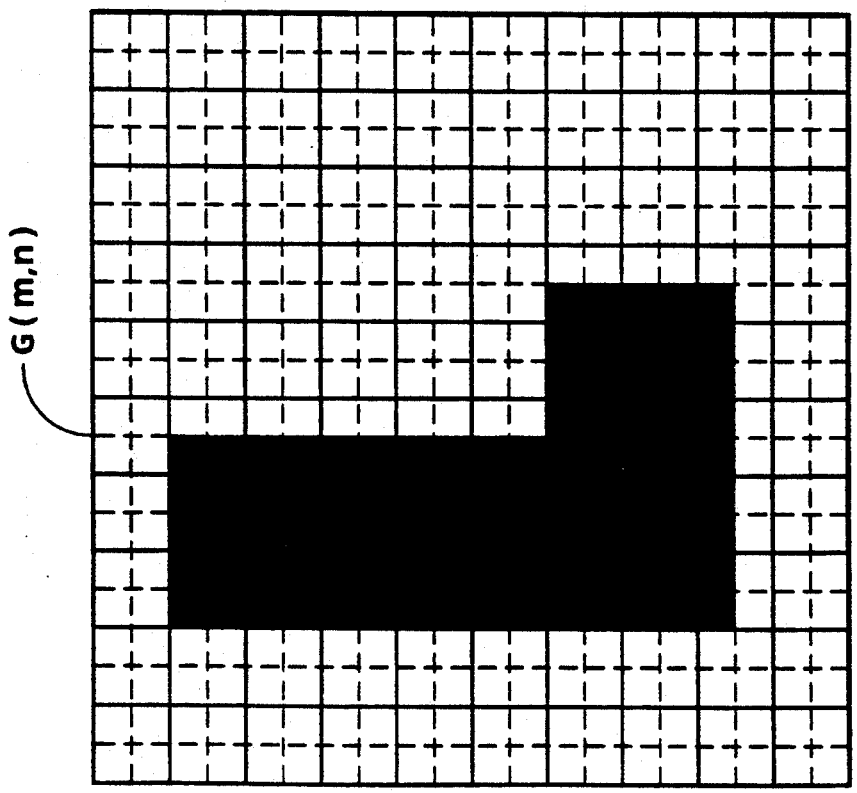

Looking now at FIG. 4, however, it can now be seen that the image, at resolution indicated by the dashed lines, is no longer aligned with the possible pixel positions of the original resolution (indicated by solid lines). The bitmap is, therefore, not printable on a device operating at the original resolution. Accordingly, the image is rescanned, or converted in resolution back to the original resolution. One method by which the conversion to the original resolution could be accomplished includes a process in which each pixel area at the original resolution is examined with an aperture having a size corresponding to a pixel at the original image resolution, to determine the optical density of the high resolution image at that location. In an image which is already highly binary, most of the output of the re-scanning process will be binary. However, at edges within the image, the aperture will cover areas that have new resolution black and white pixels. Depending on the amount of black and white in the area covered by the aperture, the output pixel will have a gray value. The process may be mathematically described as follows: G(m,n) as shown in FIG. 4 is "rescanned" with aperture apert($x/\Delta x_o$, $y/\Delta y_o$) that reflects the new resolution for the desired output and resampled at the new resolution, so that the output of the scanning function, G(k,l) can be defined as:

$$G(k,l) = \sum_{m,n=0}^{M,N} \{[G(m,n)*\text{apert}(x/\Delta x_0, y/\Delta y_0)] \cdot \delta(x - k\Delta x_0)\delta(y - l\Delta y_0)\}$$

Simplifications can be used, for the function apert($x/\Delta x_o$, $y/\Delta y_o$), which reflects the scanning aperture in order to facilitate software or implementation. Here, $\Delta x_o$ and $\Delta y_o$ will be considered to be identical to $\Delta x_{in}$ and $\Delta y_{in}$, however, different resolutions might be used.

Figure 6:
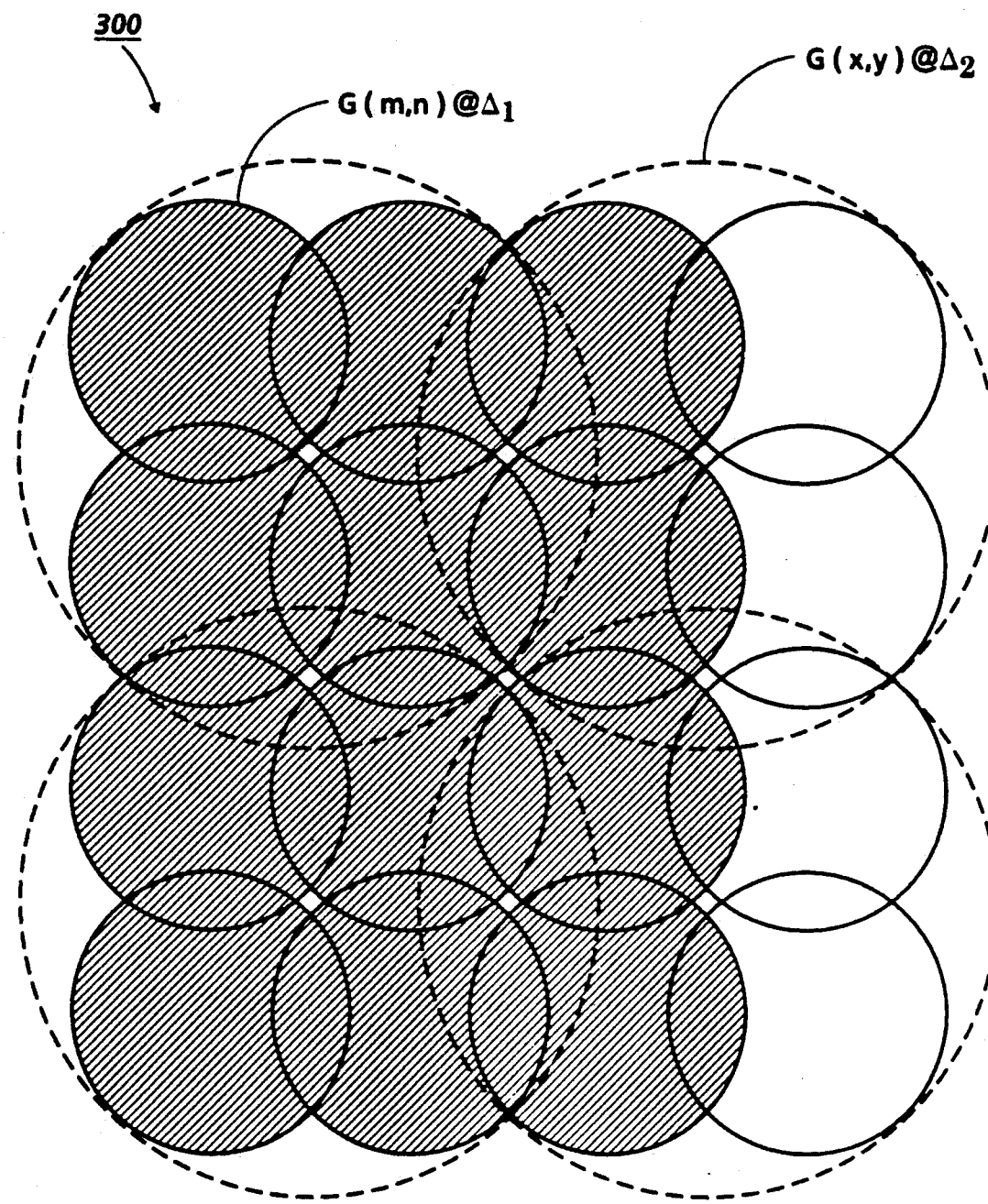
FIG. 6 shows a scheme for providing downward resolution conversion.

In the following, an approximation of apert (v,w), as squares indicated by the solid lines in FIG. 4 will be used for clarity but the described method is not restricted to this approximation. An alternate mapping function generated by convolving the two circ-functions may be used, as shown in FIG. 6. It can be seen that pixels in portion 300 of function G(m,n) at increased resolution $\Delta 1$ partially overlap with pixel positions at a second resolution $\Delta 2$. Thus, pixels at the second resolution have both black and white area coverage within the pixel, that can be considered as gray, where the level of gray, which lies between black and white, is a percentage of the area that is black. The depth 'c' of each pixel is determined by the resolutions involved and the system handling the computation of the amount of gray.

Figure 5:
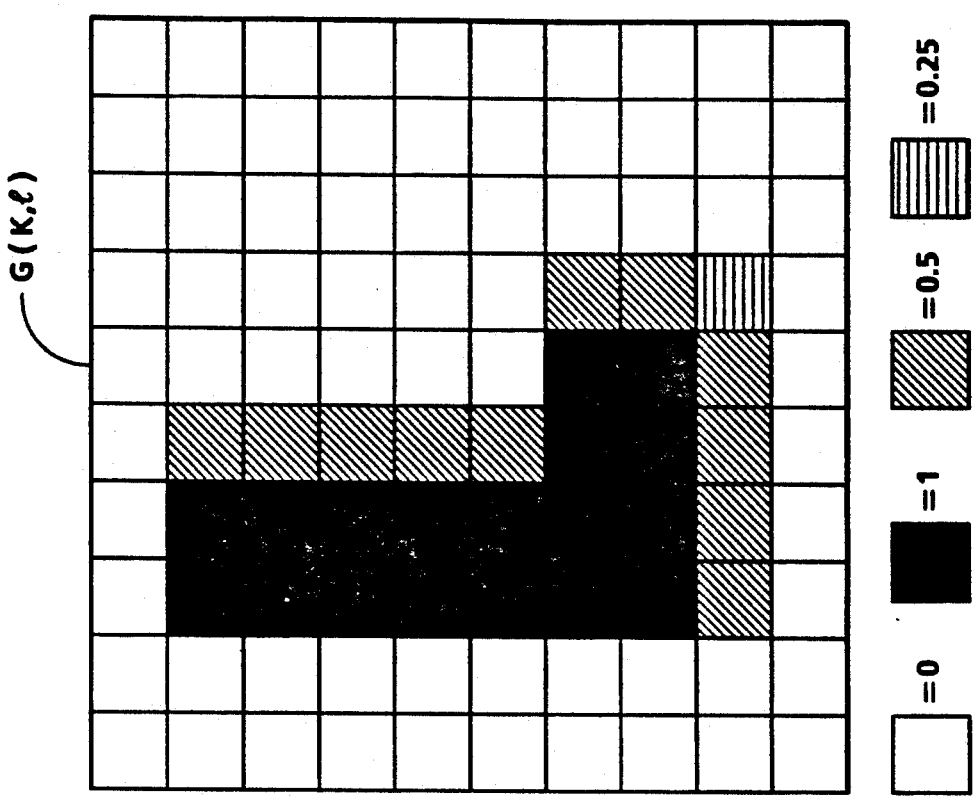

With reference now to FIG. 4, the image rescanned at the original image resolution indicated by the solid lines, deriving gray pixels as shown in FIG. 5, along a pair of edges in the fast and slow scan direction, is shown, with gray values indicated by the texture scale and given at the bottom of FIG. 5. The pixels of the image are now defined at a set 'c' of gray level values, in this simple example 5 levels, i.e.: 0, ¼, ½, ¾, and 1, a set having more members than the desired output set of d values, in this simple example 2 levels, i.e.: 0 and 1, requiring quantization. While a dithering process could be used, where each pixel within a given area is thresholded with one of a set of varying thresholds, while the set of varying thresholds is repeatedly applied across the image, dithering tends to work best over larger areas of the image, while error diffusion operates on a pixel-by-pixel basis, maintaining gray over local areas, leading to an error diffusion scheme being the preferred embodiment for the present invention. However, a non-clustering or Bayer-type dither matrix may return good results, as described in "An Optimum Method For Two-Level Rendition of Continuous-Tone Pictures,", B. E. Bayer, IEEE International Conference on Communications, Vol. 1, pp. 26-11 to 26-15 (1973).

A number of error diffusion methods can be used as acceptable quantization processes, including, for example, in "An Adaptive Algorithm for Spatial Greyscale" by Floyd and Steinberg, Proceedings of the SID 17/2, 75-77 (1976) (hereinafter, "Floyd and Steinberg"). Another would be the error diffusion technique of U.S. Pat. No. 5,045,952 to Eschbach, which serves to provide image dependent edge enhancement. Both will operate effectively. However, since the present invention contemplates a highly binary image, a process which does not disturb portions of the image in which the pixels already have legal or correct bin values may be desirable. Accordingly the adaptive error diffusion process originally described in U.S. Pat. No. 5,208,871 to Eschbach, is effective in accomplishing the desired result. In this process, each neighbor to which error may be directed is examined and compared to the possible legal values of the system. Error is directed to only those neighbors having gray values. If none of the neighbors has gray values, then error is passed in a normal manner. The process and results of the described adaptive quantization method are demonstrated. In accordance with the flow chart of FIG. 7, the adaptive error diffusion algorithm differs from the original by changing the weights and the destination of the error depending on the input context. Starting at step 400 with G(a,b), being an ordered version of the pixels in G(k,l), each pixel gray level value in G(a,b) is converted to a modified value G'(a,b) by adding the corresponding error at block 405. This modified value is thresholded at step 410, generating $I_{out}$(a,b) which is sent for printing. At step 420, error E(a,b) is derived, as the difference between the thresholded value $I_{out}$(a,b) (in a binary system, 0 or 1) and the modified gray level pixel value G'(a,b).

At step 430, if the value of G'(a,b) equals one of the legal output values of the printer system no error E(a,b) is generated. If the value of G'(a,b) is not equal to one of the legal output states of the system, the error E(a,b) is calculated as difference between the value G'(a,b) and the legal output state $I_{out}$(a,b) used at location a,b. The error E(a,b) is then distributed to succeeding adjacent pixels in an image content dependent way.

With continued reference to FIG. 7, at step 440, if all the succeeding, adjacent pixels of the pixel in consideration are gray, an error diffusion algorithm with fixed weights—not limited to the weights described in the aforementioned references—is applied at step 450. Subsequently, the next pixel is handled. Alternatively, at step 440, if any of the succeeding adjacent pixels are legal values (0, 1), then, at step 460, the function is examined to determine if all of the succeeding adjacent pixels are legal values. If all the succeeding adjacent pixels are legal values, then an error diffusion algorithm is applied at step 450, as described above, not limited to the same weight distribution as used for the case where no neighboring pixels have gray values. However, if the adjacent succeeding pixels are of mixed gray and legal values, then at step 470, the errors from a pixel having a gray level value are passed on to other gray level value pixels, as opposed to legal value pixels. Subsequent to distribution of the error, the next pixel is handled. The effect of this adaption is a reduction in image noise and a more deterministic half bitting effect on edges. It should be noted that the description is independent on the actual distribution of the errors to the succeeding neighboring gray pixels. For the special case of only one neighboring gray pixel, all distribution reduces to a locally one-dimensional form distributing all the error to that said gray pixel.

Figure 9:
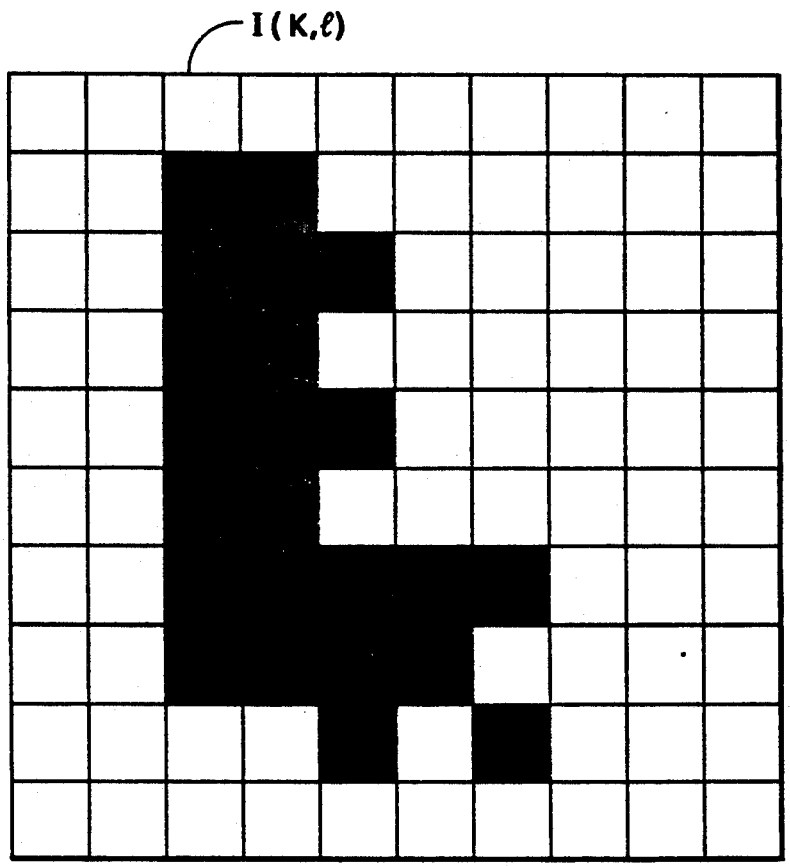

In FIG. 8, a graphic demonstration, with several examples of the adaptive error diffusion method, is shown. It is assumed, for this example, that the output is binary, and therefore only 0 and 1 are legal outputs. The system may be extended to multiple bit printing or display systems. In an example image having black, gray and white portions, where the pixel in consideration is in the gray portion of the image, as in example (A) and the adjacent succeeding pixels are mixed black (a legal value) and gray pixels, error E is distributed to only the gray pixels. When the pixel in consideration is in the white portion of the image, as in example (B) and the adjacent succeeding pixels are mixed white (a legal value) and gray pixels, error E is distributed to only the gray pixels. When the pixel in consideration is in the black portion of the image, as in example (C) and the adjacent succeeding pixels are only black (a legal value) pixels, error E is distributed to legal valued pixels. Where the pixel in consideration is in the gray portion of the image, as in example (D) and the adjacent succeeding pixels are mixed white (a legal value) and gray pixels, error E is distributed to only the gray pixels. Where the pixel in consideration is in the gray portion of the image, as in example (E) and the adjacent succeeding pixels are all gray pixels, error E is distributed to the gray pixels. In the example, an even distribution of the error E to gray pixels has been used for clarity only, without limiting the described method to this special case. FIG. 9 shows a possible output from the adaptive error diffusion process, applied to the data shown in FIG. 5.

In FIG. 10, a flow chart describing the process is shown. Generally the process includes the following steps: At step 500, initially, and perhaps off-line, a determination of image variation (the amount by which the image is altered by the printing process) is measured or determined, in terms of fractional pixel distances. The variations may occur anamorphically in the slow scan (x) and the fast scan (y) directions. At step 502, the variation amount determines the increased resolution (m,n) to accommodate image scaling. Resolution m,n is selected to be an integer multiples K and L of resolution k,l, where the actual scaling factors K, L are determined by the accuracy wanted for the fractional pixel correction, i.e.: preferably K=3 for a pixel correction of pΔx/3 in x-, L=2 for a pixel correction of qΔy/2 in y-direction, etc, making p and q an integer pixel amount at the higher resolution. At steps 504 and 506, the resolution of the image is increased in the fast and slow scan direction, respectively by factors K and L, to derive an image I(m,n). At step 507, black edge pixels in the image are detected, as being black pixels having neighbors in the fast scan and slow scan direction that are white. At steps 508 and 510, Image I(m,n) increased or decreased in size by an amount measured in pixel units at resolution m,n, by converting white pixels that are the neighbors of black edge pixels, to black pixels to increase the bitmap in size, or by converting black edge pixels to white pixels to decrease the bitmap in size.

Continuing with FIG. 10, now that the image has been varied in size to compensate for the printing process, at step 512, the image is decreased in resolution from m×n to k×l, and increased in pixel depth from d levels to c levels. At step 514, pixels at c levels are quantized to d levels, prior to output to a device for printing at d levels.

In one embodiment, a smoothing process may be used in the conversion from original resolution k×l to m×n. Many such processes exist, including one with the rules, "Add a Bit at Inside Corners", and "Erase a Bit at Outside Corners", upon detection of corners in the image, where a corner is defined as either a black pixel with five adjacent white neighbors, or a white pixel with five adjacent black neighbors. One process for a 1:2 resolution conversion of a binary image which may have particular merit, and shown in the co-pending U.S. Pat. application Ser. No. 07/802,790, filed Dec. 6, 1991 by R. Eschbach, incorporated herein by reference, attempts to maintain image density and includes the following steps: 1) increase resolution by bit doubling; 2) detect outside corners by determining for black pixels, whether the majority of pixels in a 3×3 neighborhood are white, and detect inside corners by determining for white pixels, whether the majority of pixels in a 3×3 neighborhood are black; 3) mark inside corner bits with a "+", and mark outside corner bits with a "−"; 4) for every "+" and "−" pixel pair detected within a predetermined area, turn the pixel marked "−" to white, and pixels marked "+" to black; otherwise, pixels marked "+" are designated white, while pixels marked "−" are designated black. This smoothing process is a desirable, although not required, adjunct to the described pre-compensation process, in that it smooths halfbitting, and therefore avoids a potential problem of halfbitting on halfbitting. A computer program prepared in pseudo language, and accomplishing the described smoothing process in conjunction with a resolution increase by a factor of 2 in both fast scan and slow scan directions is provided in the attached Appendix. It can no doubt be appreciated that the program gives one specific example of an implementation and was written for clarity purposes only.

The invention has been described with reference to a particular embodiment. Modifications and alterations will occur to others upon reading and understanding this specification. It is intended that all such modifications and alterations are included insofar as they come within the scope of the appended claims or equivalents thereof.

APPENDIX

```
/* constants */
whiteValue: CONSTANT = 255;
blackValue: CONSTANT = 0;
averageWhite: CONSTANT = 1275; /* Five pixels white */
averageBlack: CONSTANT = 1020; /* Five pixels black */
```

```
whiteAvgBlack: CONSTANT = 125; /* white wanting to be black */
blackAvgWhite: CONSTANT = 100; /* black wanting to be white */
line1: CONSTANT = 0; /* first line of buffer */
line2: CONSTANT = 1;
line3: CONSTANT = 2;

/*
Input a packed image of mPixels by nScanlines, where m = 2k, n = 2l,
generated by bit-doubling the original k,l size binary image. Procedure
returns an image 8 bits per pixel image with double the resolution with 4
values comprising: black = 0, white = 255, black wanting to be white =
100, white wanting to be black 125.
*/

Procedure1: FUNCTION [packedImage: PACKED ARRAY [0..mPixels-1][
0..nScanlines-1] OF BIT]
   RETURNS [image: PACKED ARRAY [0..mPixels-1][ 0..nScanlines-1] OF BYTE]
BEGIN /* variables */
average, nScanlines /* slowScan */, mPixels /* fastScan */ : CARDINAL;
buffer: PACKED ARRAY [0..mPixels + 1][0..line3] OF BYTE;

/* unpack the image to 8 bits per pixel */
FOR (i = 0; i < nScanlines; i + +) DO
 FOR (j = 0; j < mPixels; j + +) DO
  IF packedImage [j][i] = blackValue
    THEN image [j][i] = blackValue
    ELSE image [j][i] = whiteValue;

/* read the first scanline twice into the buffer for averaging */
buffer [1..mPixels][line1] = image[0..mPixels-1][line1];
buffer [0][line1] = buffer [1][line1];
buffer [mPixels + 1][line1] = buffer [mPixels][line1];
buffer [1..mPixels][line2] = image[0..mPixels-1][line1];
buffer [0][line2] = buffer [1][line2];
buffer [mPixels + 1][line2] = buffer [mPixels][line2];

FOR (i = 0; i < nScanlines; i + +) DO /* for every scanline do the following */

BEGIN

/* fill the buffer with the next scan line from the image */
IF i + 1 < nScanlines
  THEN buffer [0..mPixels-1][line3] = image [0..mPixels-1][i + 1]
  ELSE buffer [0..mPixels-1][line3] = image [0..mPixels-1][i]
buffer [0][line3] = buffer [1][line3];
buffer [mPixels + 1][line3] = buffer [mPixels][line3];

FOR (j = 1; j < = mPixels; j + +) DO

BEGIN

/* Average over 3x3 */
average = buffer [j-1][line1] + buffer [j][line1] + buffer [j + 1][line1]
```

```
          buffer [j-1][line2] + buffer [j][line2] + buffer [j + 1][line2]
          buffer [j-1][line3] + buffer [j][line3] + buffer [j + 1][line3];

/* modify the image */
    image [j][i] = SELECT TRUE FROM

/* Pixel is white, average is 'white' */
        (buffer [j][line2] = whiteValue) AND (average > = averageWhite) ->
    whiteValue;

/* Pixel is black, average is 'black' */
        (buffer [j][line2] = blackValue) AND (average < = averageBlack) ->
    blackValue;

/* Pixel is white, average is 'black' */
        (buffer [j][line2] = whiteValue) AND (average < = averageBlack) ->
    whiteAvgBlack;

/* Pixel is black, average is 'white' */
        (buffer [j][line2] = blackValue) AND (average > = averageWhite) ->
    blackAvgWhite;

ENDCASE;

END; /* FOR (j = 1; j < = mPixels; j + +) */

/* move the lines in the buffer up by one */
    buffer [0..mPixels-1][line1] = buffer [0..mPixels-1][line2];
    buffer [0..mPixels-1][line2] = buffer [0..mPixels-1][line3];

END; /* FOR (i = 0; i < nScanlines; i + +) */
END; /* Procedure1 */

/*
Output from Procedure1 is passed to Procedure2 which returns a modified
binary image
with the same resolution as the original image passed to Procedure1.
*/

Procedure2: FUNCTION [image: PACKED ARRAY [0..mPixels-
1][0..nScanlines-1] OF BYTE]
    RETURNS [newImage: PACKED ARRAY [0..mPixels-1][0..nScanlines-1] OF
BIT]
BEGIN /* variables */
continue: BOOLEAN;
nScanlines /* slowScan */, mPixels /* fastScan */ : CARDINAL;
buffer: PACKED ARRAY [0..mPixels + 1][0..line3] OF BYTE;

/* read the first scanline twice into the buffer */
buffer [1..mPixels][line1] = image[0..mPixels-1][line1];
buffer [0][line1] = buffer [1][line1];
buffer [mPixels + 1][line1] = buffer [mPixels][line1];
buffer [1..mPixels][line2] = image[0..mPixels-1][line1];
```

```
buffer [0][line2] = buffer [1][line2];
buffer [mPixels + 1][line2] = buffer [mPixels][line2];

FOR (i = 0; i < nScanlines; i + +) DO
 BEGIN

/* fill the buffer with the next scan line from the image */
 IF i + 1 < nScanlines
   THEN buffer [1..mPixels][line3] = image [0..mPixels-1][i + 1]
   ELSE buffer [1..mPixels][line3] = image [0..mPixels-1][i]
 buffer [0][line3] = buffer [1][line3];
 buffer [mPixels + 1][line3] = buffer [mPixels][line3];

FOR (j = 1; j < = mPixels; j + +) DO

BEGIN

/* black wanting to be white */
 /* only need to check one type */
 /* only need to check along the diagonals */
 IF buffer [j][line2] = blackAvgWhite THEN
   BEGIN
   buffer [j][line2] = whiteValue; /* set value to white */
   continue = TRUE;

/* Can top-left be changed to to black? */
   IF buffer [j-1][line1] = whiteAvgBlack THEN
         BEGIN
         buffer [j-1][line1] = blackValue; /* Yes */
         continue = FALSE;
         END;

/* Can top-right be changed to to black? */
   IF continue = TRUE AND buffer [j + 1][line1] = whiteAvgBlack THEN
         BEGIN
         buffer [j + 1][line1] = blackValue; /* Yes */
         continue = FALSE;
         END;

/* Can down-left be changed to to black? */
   IF continue = TRUE AND buffer [j-1][line3] = whiteAvgBlack THEN
         BEGIN
         buffer [j-1][line3] = blackValue; /* Yes */
         continue = FALSE;
         END;

/* Can down-right be changed to to black? */
   IF continue = TRUE AND buffer [j + 1][line3] = whiteAvgBlack THEN
         BEGIN
         buffer [j + 1][line3] = blackValue; /* Yes */
         continue = FALSE;
         END;

/* Can't change it to white, set it to black. */
   IF continue = FALSE THEN
         buffer [j][line2] = blackValue;
```

```
/* Only need to match up one type,
   so reset what is left of the other. */
IF buffer [j-1][line1] > = whiteAvgBlack THEN
       buffer [j-1][line1] = whiteValue;

END; /* IF buffer [j][i] = blackAvgWhite */

END; /* FOR (j = 1; j < = mPixels; j + +) */

/* Pack the buffer into the newImage */
IF i = 0 THEN NULL /* if i equals the first scan line don't do anything yet */
ELSE /* save the previous scan line */
FOR (j = 1; j < = mPixels; j + +) DO
   IF buffer [j][line1] = blackValue
       THEN newImage [j][i] = 0 /* blackValue */
       ELSE newImage [j][i] = 1; /* whiteValue */
/* if i equals the last scan line save it */
IF i = nScanlines-1 THEN
  FOR (j = 1; j < = mPixels; j + +) DO
   IF buffer [j][line2] = blackValue
       THEN newImage [j][i] = 0 /* blackValue */
       ELSE newImage [j][i] = 1; /* whiteValue */
/* Move the scan lines in the buffer up by one */
buffer[0..mPixels-1][line1] = buffer[0..mPixels-1][line2];
buffer[0..mPixels-1][line2] = buffer[0..mPixels-1][line3];

END; /* FOR (i = 0; i < nScanlines; i + +) */

END; /* Procedure2 */
```

I claim:

1. A method of pre-compensating a bitmap of a binary image defined with pixels at a resolution k+1, and having first and second states, each state indicating to a destination output device whether or not to write a spot at a pixel location, where k and l represent a number of pixels in a scan line parallel to a fast scan direction and a number of scan lines of pixels in a slow scan direction, per unit distance, to account for erosion or dilation effects of an imaging process, by increments not equal to a pixel distance, including the steps of:

increasing the resolution at which the bitmap is defined from k×l, to Kk×Ll, where K and L are resolution multipliers;

varying the number of pixels at a first state with respect to pixels at a second state, the variation in the amount of first state pixels occurring at transitions in the image from first state pixels to second state pixels;

decreasing the resolution at which the bitmap is defined from Kk×Ll to k×l, and increasing the number of states at which pixels are defined in the image to c, where c is an integer greater than 2; and quantizing pixels in the image defined at c states to reduce the number of states at which the pixels are defined to 2.

2. The method as defined in claim 1, wherein for erosion or dilation by an increment of $p/r$ pixel distance equivalents in the fast scan direction, K=r and p is a multiplier of the pixel distance equivalent $1/r$.

3. The method as defined in claim 1, wherein for erosion or dilation by an increment of $q/r$ pixel distance equivalents in the slow scan direction, L=r and q is a selected multiplier of the pixel distance equivalent $1/r$.

4. The method as defined in claim 3, wherein for erosion or dilation by an increment of $p/r$ pixel distance equivalents in the fast scan direction, K=r, p is a selected multiplier of the pixel distance equivalent $1/r$, and K=L.

5. The method as defined in claim 1, the step of increasing the resolution at which the bitmap is defined from k×l, to Kk×Ll, includes a smoothing process, to remove halfbitting which may be present in the image.

6. The method as defined in claim 1, wherein for erosion or dilation by an increment of $p/r$ pixel distance equivalents in the fast scan direction, K=r, and the amount of pixels at the first state is varied at each transition in the fast scan direction, by a number of pixels equal to p.

7. The method as defined in claim 1, wherein for erosion or dilation by an increment of $q/r$ pixel distance equivalents in the slow scan direction, L=r, and the amount of pixels at a first state is varied at each transition in the slow scan direction, by a number of pixels equal to q.

8. The method as defined in claim 1, wherein the step of varying the number of pixels at a first state with respect to pixels at a second state in the image includes a transition detecting step of finding a pixel having the first state having adjacent thereto in the slow scan direction a pixel having the second state.

9. The method as defined in claim 8, wherein the transition detecting step of finding a pixel having a first value having adjacent thereto in the slow scan direction a pixel having a second value, includes the further substep of converting the second state pixel to a first state pixel.

10. The method as defined in claim 1, wherein the step of quantizing pixels in the image defined at c states, each state representable by an optical density value, to reduce the number of states at which the pixels are defined to 2, includes the substep of applying a threshold level to an optical density value of each pixel, to produce a threshold pixel value having one of 2 states, and applying a value of the difference between the pixel optical density value before thresholding and after thresholding to a predetermined group of neighboring pixels.

11. The method as described in claim 10, including the additional step of:
for each neighboring pixel in the predetermined plurality to which the difference value is to be applied, comparing the value of the neighboring pixel to a number of legal output values, and if any pixel value of the predetermined plurality of neighboring pixels is equal to one of the legal output values, then the value of the difference is not applied to that pixel, unless all of the values of the predetermined plurality of pixels are legal values.

12. A method of pre-compensating a bitmap of a binary image defined with pixels at a resolution $k \times l$, with a pixel depth of 2, where k and l represent a number of pixels x in a scan line parallel to a fast scan direction and a number of scan lines y of pixels in a slow scan direction, per unit distance, to account for erosion effects of an imaging process, by increments not equal to a pixel distance, including the steps of:
increasing the resolution at which the bitmap is defined from $k \times l$, to $Kk \times Ll$, where K and L are resolution multipliers;
increasing an amount of pixels at a first state with respect to pixels at a second state, each state indicating to a destination output device whether or not to write a spot at a pixel location, defined at resolution $Kk \times Ll$, the increase in the amount of first state pixels occurring at edges in the image;
decreasing the resolution at which the bitmap is defined from $Kk \times Ll$ to $k \times l$, and increasing the pixel depth at which the image is defined to c levels, where c is an integer greater than 2;
applying a threshold level to each pixel value in the image, to produce a thresholded pixel value having one of 2 levels, and
applying the value of the difference between the pixel value and the threshold pixel value to a predetermined plurality of neighboring pixels:
for each neighboring pixel in the predetermined plurality to which the difference value is to be applied, comparing the value of the neighboring pixel to a number of legal output values, and if any pixel value of the predetermined plurality of neighboring pixels is equal to one of the legal output values, then the value of the difference is applied to pixel values in the predetermined plurality that are equal to legal output values, unless all of the values of the predetermined plurality of pixels are legal values.

13. A method of pre-compensating a bitmap of an image defined by pixels, each pixel having one of n possible states, each of said n possible states indicating to a destination output device the density of a spot to be written to the pixel location, the bitmap defined at a resolution $k \times l$, where k and l represent a number of pixels in a scan line parallel to a fast scan direction and a number of scan lines of pixels in a slow scan direction, per unit distance, to account for erosion or dilation effects of an imaging process, by increments not equal to a pixel distance, including the steps of:
increasing the resolution at which the bitmap is defined from $k \times l$, to $Kk \times Ll$, where K and L are resolution multipliers;
varying the number of pixels at a given first one of said n states with respect to pixels at a second, different state of said n states, the variation in the amount of first state pixels occurring at transitions in the image from first state pixels to any other pixel state;
decreasing the resolution at which the bitmap is defined from $Kk \times Ll$ to $k \times l$, and increasing the number of states at which pixels are defined in the image to c, where c is an integer greater than n; and
quantizing pixels in the image defined at c states to reduce the number of levels at which the pixels are defined to n.

* * * * *